United States Patent [19]

Marsilia et al.

[11] 3,785,208

[45] Jan. 15, 1974

[54] CLINICAL THERMOMETER

[75] Inventors: Louis P. Marsilia, East Boston; Robert J. Moran, Littleton, both of Mass.

[73] Assignee: Cardinal Instruments Corporation, Cambridge, Mass.

[22] Filed: May 11, 1971

[21] Appl. No.: 142,241

[52] U.S. Cl. ............................. 73/368.4, 73/343 R
[51] Int. Cl. ............................................. G01k 5/42
[58] Field of Search .................... 73/368.4, 343 R, 73/396; 220/16.6; 74/2

[56] References Cited
UNITED STATES PATENTS

| | | | |
|---|---|---|---|
| 3,521,490 | 7/1970 | Henning et al. | 73/368.4 |
| 3,461,724 | 8/1969 | Tong et al. | 206/16.5 |
| 2,677,965 | 5/1954 | Saffin | 206/16.5 X |
| 2,009,298 | 7/1935 | Nelson et al. | 74/2 |
| 3,386,065 | 5/1968 | Algino | 73/368.4 X |
| 1,251,745 | 1/1918 | Bowers | 73/396 |
| 3,593,581 | 7/1971 | Beightol | 73/362 R |
| 3,680,385 | 8/1972 | Moran et al. | 73/368.4 |

Primary Examiner—Richard C. Queisser
Assistant Examiner—Daniel M. Yasich
Attorney—Morse, Altman & Oates

[57] ABSTRACT

A quickly responsive, dial-type clinical thermometer is provided to give fast, accurate and easily readable clinical temperatures. A temperature sensitive liquid is sealed in a sensing probe element and expands proportionately with a rise in temperature. The liquid in the probe communicates with an attached bellows which is flexed by the expanding liquid to actuate a dial indicator drivingly connected to the bellows. The indicator dial is graduated with temperature markings. A simple locking arrangement holds the indicator needle at the highest recorded temperature until reset by replacing a disposable sterile probe cover. Placement of a new cover over the probe tip automatically resets the indicator needle.

8 Claims, 4 Drawing Figures

PATENTED JAN 15 1974

3,785,208

INVENTOR
ROBERT J. MORAN
LOUIS P. MARSILIA

BY Moro, Altman & Oates

ATTORNEYS

CLINICAL THERMOMETER

BACKGROUND OF THE INVENTION

1. Field of the Invention

This invention relates generally to a temperature measuring device and more particularly is directed towards a new and improved clinical thermometer of simple, low cost construction and compact design which does not require sterilization between use.

2. Summary of the Prior Art

At present there are two principal types of clinical thermometers in general use by doctors and nurses as well as in the home. These include the conventional glass bulb mercury-filled thermometer and the more recent electronic thermometer. These instruments suffer from several significant drawbacks. For example, the glass bulb thermometer has an extremely slow response time typically requiring from three to five minutes to provide a reading. Furthermore, the indicated temperature is quite difficult to read because of the size of the instrument and the need to position the bulb at exactly the right angle with respect to a light source before the mercury becomes visible. Furthermore, the glass bulb represents a potential hazard to patients due to the constant danger of breakage from the fragile glass and the inability to achieve effective sterility. The latter factor is known to be a regular source of reinfection or cross-infection among patients. While the cost of the glass bulb thermometer is low, the vast number used and the high rate of breakage substantially increases the cost per temperature.

The more recent electronic thermometer employs battery power and, as a result, its accuracy is subject to variations depending upon the condition of the battery. Thus, to compensate for this variation, it is necessary frequently to recalibrate the instrument. Electronic thermometers generally consist of two elements, a control indicator unit that is carried by the operator and a cable-connected patient probe. This combination is rather cumbersome in practice but more significantly, the cost of electronic thermometers generally is beyond the means of the average user.

Accordingly, it is an object of this invention to provide an accurate clinical thermometer which is easy to use and read, is of a simple low cost construction requiring no maintenance and does not require sterilization.

SUMMARY OF THE INVENTION

This invention features a clinical thermometer, comprising a probe tip and a bellows communicating with one another and filled with a temperature-responsive liquid whereby the bellows will expand in response to heat applied to the probe tip. An indicating dial is drivingly connected to the bellows and is graduated in temperature markings whereby displacement of the bellows will actuate the indicator to visually display the monitored temperature. A locking mechanism engages the indicator mechanism for locking the indicator at the recorded temperature until released. Disposable sterile probe covers are provided which not only protect the patient from infection but also resets the indicator upon replacement of the cover.

DETAILED DESCRIPTION OF THE PREFERRED EMBODIMENT

Figure 1:
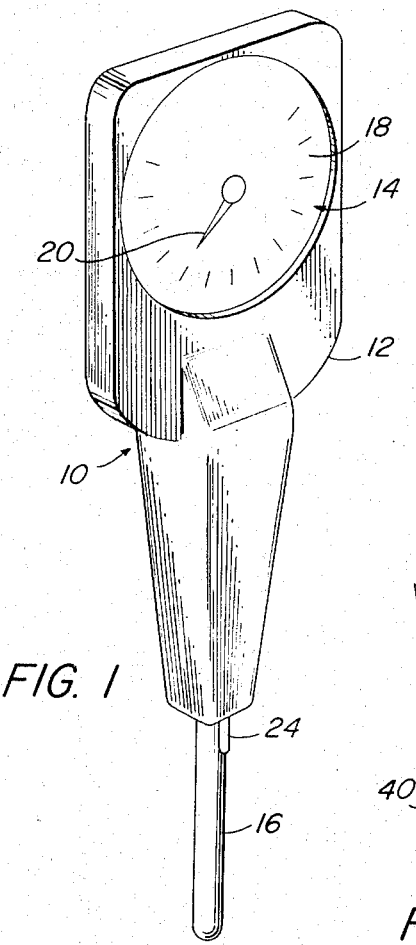
FIG. 1 is a view in perspective of a clinical thermometer made according to the invention.

Referring now to the drawings, the reference character 10 generally indicates a clinical thermometer comprised of a housing 12 at the upper end of which is a temperature indicating dial 14 which responds to heat applied to a probe tip 16 projecting from the opposite end of the housing 12. The indicator 14 includes a graduated dial face 18, typically ranging from 96° to 108°F, to cover the temperatures of interest normally encountered in humans, and an indicating needle 20. A disposable probe cover 22 in the form of a sleeve fits over the probe tip 16 to prevent patient infection and also to actuate a reset pin 24 projecting out from the lower end of the housing adjacent the probe tip 16. The risk of cross-infection may be reduced by fabricating the housing 12 from a self-sanitizing material such as a plastic composition with a hexaclorophene additive.

Figure 2:
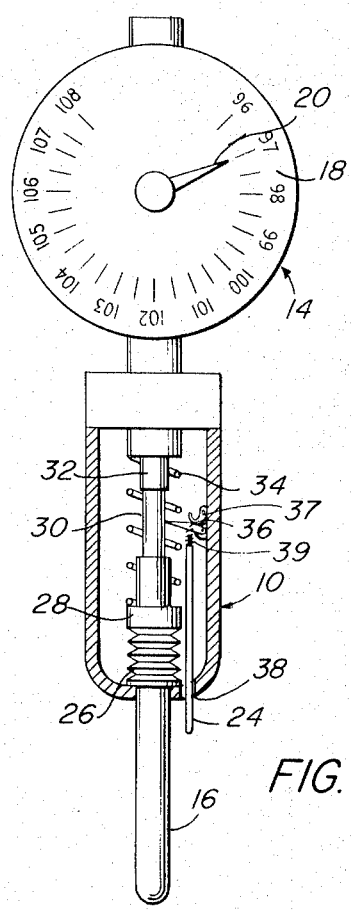
FIG. 2 is a view in front elevation, partly in section, of the instrument.
Figure 3:
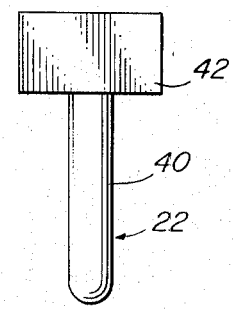
FIG. 3 is a sectional side view of a probe cover made according to the invention.

Referring now more particularly to FIG. 2 there are shown details of the indicator actuating mechanism. As shown, the probe tip 16 is in the form of an elongated closed cylinder although other configurations may be employed. The probe tip 16 is sealed to an expansible bellows 26, both the bellows and the probe tip being filled with a temperature responsive fluid. Preferably, the fluid employed is a liquid displaying a high coefficient of thermal expansion such, for example, alcohol or the like. At the top of the bellows 26 is secured a hub 28 fastened to a connecting rod 30 engaging the lower end of a stem 32 which is part of the actuating mechanism for the dial indicator 14. The dial indicator 14 employs conventional gearing components well known in the art and are not shown in detail. Essentially, the linear motion of the stem 32 is converted to the rotary motion of the indicator needle 20, the motion being a function of the monitored temperature. In order to compensate for the spring rate of the bellows 26, a spring 34 is coiled about the stem 30 and bears against the shoulder portion of the hub 28 normally urging it downwardly as viewed in FIG. 2.

The reset pin 24 extends parallel to the prove bellows and stem assembly and engages a one-way pawl 37 which is pivoted to the inner face of the shank portion of the housing 12 and serves as a clutch in the operation of the instrument. The inner free end of the pawl 36 is urged against a smooth portion of the threaded stem 30 by means of a light spring 37 and is positioned to lock the stem at the end of its axial motion on a temperature reading. Thus, as the stem 30 moves upwardly, as viewed in FIG. 2, to its maximum temperature recording position the pawl will engage and lock the stem against retraction, thus holding the indicator needle at the highest recorded temperature reading. The thermometer may be removed from the patient's mouth and the temperature reading will remain visible for any length of time until the instrument is reset by an upward motion of the reset pin 24 which connects to the pawl 36 by means of a light spring 39. The springs 37 and 39 are selected so as to allow the spring 37 to yield momentarily when the pin 24 is first pushed upwardly when a fresh cover is applied but then to quickly overcome the spring 37 to allow the pawl to reengage the stem.

It will be seen that the lower end of the reset pin 24 projects through an opening 38 adjacent the probe tip 16 where it passes through the housing 10. In this position, the reset pin 24 will be actuated each time a fresh probe cover 22 is applied over the probe tip 16. As shown, the probe cover is contoured to conform with the shape of the probe tip 16 and to fit smoothly over the probe without binding. The cover 22 comprises a lower sleeve portion 40 closed at its lower end and a wide mouth portion 42 at its upper end adapted not only to fit over the lower portion of the housing but also to provide a pin-engaging shoulder 44 which will bear against the pin 24 when the cover 22 is fully in position. Thus, the instrument will be reset automatically each time a cover is applied and the need to reset will remind the user that a fresh, sterile cover should be applied before another temperature is to be taken. The cover 40 may be fabricated from plastic, aluminum or the like and preferably should be of a material having good heat conducting properties so as not to interfere with the response time of the instrument.

Figure 4:
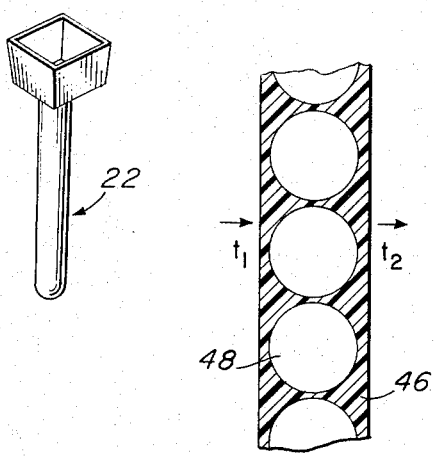
FIG. 4 is a detailed enlarged sectional view of the probe cover.

Referring now more particularly to FIG. 4 of the drawings, there is shown a detail section of a probe cover made according to the invention. As shown, the walls of the probe cover are fabricated from a plastic material forming a matrix 46 in which are distributed thermally conductive metal particles 48. The inclusion of the metal particles 48 in the cover wall maximizes heat conductivity so that the patient's temperature will transfer through the cover in the shortest possible time.

While irregularly shaped metal particles may be used as a filler, better heat transfer results may be obtained with spherical metal powders since there is no need to orient the particles within the matrix. Preferably, the spherical powders should have a diameter slightly less than the thickness of the wall so that the metal powder provides the major path along which the heat has to flow.

The metal particles may be copper or copper, tin, or silver plated powder. Tin or silver plate is preferred to prevent oxidation of probe cover which must be placed in the patient's mouth.

The matrix 46 typically is a relatively stiff plastic material such as TFE and may include a self-sanitizing agent such as hexachlorophene.

By using a liquid medium which completely fills the probe and bellows, the instrument will respond to a heat source at any angle. To compensate for non-linearity in the expansion characteristics of the liquid and/or the bellows, the dial 18 may be graduated in a non-linear fashion.

Having thus described the invention what I claim and desire to obtain by Letters Patent of the U.S. is:

1. A clinical thermometer, comprising
   a. a support,
   b. a dial indicator mounted to said support and bearing a temperature scale,
   c. a movable indicator needle operatively connected to said indicator proximate to said scale and movable in response to actuation of said indicator,
   d. a bellows mounted to said support,
   e. a probe extending from said bellows and communicating therewith,
   f. a temperature responsive fluid within said probe and bellows adapted to expand said bellows in response to heat applied to said probe and retract on removal of heat,
   g. a member slidably mounted to said support for reciprocating movement with respect thereto and drivingly connecting said bellows to said indicator whereby said needle will move with respect to said scale in response to expansion and retraction of said bellows,
   h. spring means drivingly connected between said member and said support and normally urging said member to a retracted position,
   i. clutch means mounted to said support and normally engageable with said member to prevent retraction of said member after an expansion movement of said bellows to maintain a maximum temperature indicating position of said needle,
   j. release means drivingly connected to said clutch means and having a portion adjacent said probe and adapted to disengage said clutch means from said member when actuated to allow said member to return to a starting position, and,
   k. a removable probe cover engageable with said portion for actuation of said release means when in position over said probe.

2. A clinical thermometer according to claim 1 wherein said fluid is a liquid filling both said bellows and said probe.

3. A clinical thermometer according to claim 2 wherein said liquid is alcohol.

4. A clinical thermometer according to claim 1 wherein said scale is non-linear.

5. A clinical thermometer according to claim 1 wherein said clutch means includes a pawl pivotally mounted to said support and extending into engagement with said member.

6. A clinical thermometer according to claim 5 wherein said release means includes a pin engaging said pawl and adapted to pivot said pawl out of engagement with said member upon reciprocation of said pin.

7. A clinical thermometer according to claim 6 wherein said cover includes a shoulder portion adapted to engage said pin.

8. A thermometer, comprising in combination
   a. a housing,
   b. a temperature indicator movably mounted to said housing,
   c. releasable clutch means mounted to said housing and operatively connected to said indicator for locking said indicator at a maximum temperature indicating position,
   d. temperature responsive drive means movably mounted to said housing and operatively connected to said indicator and adapted to move said indicator from a start position to a temperature recording position,
   e. spring means mounted to said housing engaging said drive means to urge said drive means to a start position,
   f. a probe mounted to said housing and operatively connected to said drive means,
   g. reset means movably mounted to said housing proximate to said probe and operatively connected to said clutch means and adapted on actuation to release said clutch means and allow said indicator to return to a start position.
   h. a removable probe cover having a reset engaging portion adapted to engage and actuate said reset means when mounted on said probe.

* * * * *